(12) United States Patent
Panchenko et al.

(10) Patent No.: US 10,544,256 B2
(45) Date of Patent: Jan. 28, 2020

(54) USE OF OLIGO-N,N-BIS(3-AMINOPROPYL) METHYLAMINE AS CURING AGENT FOR EPOXY RESINS

(71) Applicant: BASF SE, Ludwigshafen (DE)

(72) Inventors: Alexander Panchenko, Ludwigshafen (DE); Monika Charrak, Bobenheim-Roxheim (DE); Ansgar Gereon Altenhoff, Heidelberg (DE); Thomas Reissner, Mannheim (DE); Christian Krausche, Ruedlingen (CH)

(73) Assignee: BASF SE, Ludwigshafen (DE)

( * ) Notice: Subject to any disclaimer, the term of this patent is extended or adjusted under 35 U.S.C. 154(b) by 7 days.

(21) Appl. No.: 15/741,536

(22) PCT Filed: Jul. 8, 2016

(86) PCT No.: PCT/EP2016/066249
§ 371 (c)(1),
(2) Date: Jan. 3, 2018

(87) PCT Pub. No.: WO2017/009220
PCT Pub. Date: Jan. 19, 2017

(65) Prior Publication Data
US 2018/0201721 A1    Jul. 19, 2018

(30) Foreign Application Priority Data
Jul. 13, 2015  (EP) ................................... 15176379

(51) Int. Cl.
| C08G 59/50 | (2006.01) |
| C08G 59/24 | (2006.01) |
| C08K 7/02  | (2006.01) |
| C09D 163/00 | (2006.01) |

(52) U.S. Cl.
CPC ....... C08G 59/5013 (2013.01); C08G 59/245 (2013.01); C08K 7/02 (2013.01); C09D 163/00 (2013.01)

(58) Field of Classification Search
CPC .............. C08G 59/5013; C08G 59/245; C08G 59/5006; C08K 7/02; C09D 163/00
USPC ........................................................ 523/400
See application file for complete search history.

(56) References Cited

U.S. PATENT DOCUMENTS

| 2011/0028603 A1* | 2/2011 | Peretolchin | ............ C08G 59/18 523/446 |
| 2011/0082248 A1* | 4/2011 | Butikofer | ........... C08G 59/4042 524/500 |
| 2011/0294977 A1* | 12/2011 | Schaub | ................. C07C 209/16 528/422 |
| 2013/0248110 A1 | 9/2013 | Lee et al. | |

FOREIGN PATENT DOCUMENTS

| EP | 0636409 A1 | 2/1995 |
| WO | 2014/131649 A1 | 9/2014 |
| WO | 2015/022186 A1 | 2/2015 |

OTHER PUBLICATIONS

Netopilík, M. et al. "Number-average molecular weight of branched polymers from SEC with viscosity detection and universal calibration" Polymer International, vol. 57, No. 10, 2008, pp. 1152-1158.
International Search Report dated Oct. 17, 2016, in PCT/EP2016/066249, flied Jul. 8, 2016.

* cited by examiner

*Primary Examiner* — David T Karst
(74) *Attorney, Agent, or Firm* — Oblon, McClelland, Maier & Neustadt, L.L.P.

(57) ABSTRACT

The present invention relates to the use of oligo-N,N-bis(3-aminopropyl)methylamine as hardener for epoxy resins, and also to a corresponding curable composition, curing thereof, and the cured epoxy resin obtainable therefrom.

17 Claims, No Drawings

USE OF OLIGO-N,N-BIS(3-AMINOPROPYL) METHYLAMINE AS CURING AGENT FOR EPOXY RESINS

The present invention relates to the use of oligo-N,N-bis (3-aminopropyl)methylamine (polyBAPMA) as hardener for epoxy resins, and also to a curable composition which comprises one or more epoxy resins and polyBAPMA. The invention further relates to the curing of the curable composition, and also to the cured epoxy resin obtained through curing of the curable composition.

Epoxy resins are well known and, because of their toughness, flexibility, adhesion, and chemicals resistance, are used as materials for surface coating, and as adhesives, and for molding and lamination processes. In particular, epoxy resins are used for producing carbon fiber-reinforced or glass-fiber-reinforced composite materials.

Epoxy materials are polyethers and can by way of example be produced through condensation of epichlorohydrin with a diol, an example being an aromatic diol such as bisphenol A. These epoxy resins are then cured via reaction with a hardener, typically a polyamine.

By way of example, an amino compound having two amino groups can be used to cure epoxy compounds having at least two epoxy groups via a polyaddition reaction (chain extension). Amino compounds having high reactivity are generally added only briefly before curing is desired. Systems of this type are therefore known as two-component (2C) systems.

Aminic hardeners are in principle divided in accordance with their chemical structure into aliphatic, cycloaliphatic, and aromatic types. Another possible classification uses the degree of substitution of the amino group, which can be either primary, secondary, or tertiary. However, for the tertiary amines a catalytic curing mechanism is postulated for epoxy resins, whereas in the case of the secondary and primary amines the construction of the polymer network is thought to be based on stoichiometric curing reactions.

It has generally been shown that, within the primary amine hardeners, the highest reactivity in epoxy curing is exhibited by the aliphatic amines. The cycloaliphatic amines usually react somewhat more slowly, while the aromatic amines (amines in which the amino groups are directly bonded to a carbon atom of the aromatic ring) exhibit by far the lowest reactivity.

These known reactivity differences are utilized during the hardening of epoxy resins in order to permit adjustment of the time available for processing, and of the mechanical properties of the hardened epoxy resins, in accordance with requirements.

Rapid-hardening systems with curing times by way of example s 10 minutes, e.g. adhesives, floor coatings, and certain resin transfer molding (RTM) applications, often use short-chain aliphatic amines, whereas the production of large-surface-area composite materials requires a longer pot life in order to achieve uniform filling of the mold, and in order to ensure adequate impregnation of the reinforcement fibers. Materials used here are predominantly cycloaliphatic amines, for example isophoronediamine (IPDA), 4,4'-diaminodicyclohexylmethane (dicykan), 3,3'-dimethyl-4,4'-diaminodicyclohexylmethane (dimethyldicykan), hydrogenated bisaniline A (2,2-di(4-aminocyclohexyl)propane), hydrogenated toluenediamines (for example 2,4-diamino-1-methylcyclohexane or 2,6-diamino-1-methylcyclohexane), 1,3-bis(aminomethyl)cyclohexane (1,3-BAC). Still longer hardening times could be achieved by using aromatic polyamines, for example phenylenediamines (ortho, meta or para), bisanilin A, toluenediamines (for example 2,4-toluenediamine or 2,6-toluenediamine), diaminodiphenylmethane (DDM), diaminodiphenyl sulfone (DDS), 2,4-diamino-3,5-diethyltoluene, or 2,6-diamino-3,5-diethyltoluene (DETDA 80).

In particular for the use in floor coatings, hardeners are required which provide rapid hardening with epoxy resin even at room temperature, without having excessively high initial viscosity, and which give rise to coatings with advantageous mechanical properties. It is preferable that the coatings achieve early-stage water resistance within as little as a few hours.

These applications typically use hardeners such as triethylenetetramine (TETA) or the polyetheramine D-230 (di-functional, primary polyetheramine based on polypropylene glycol with average molecular weight 230; D230). These hardeners have the particular disadvantage of comparatively high volatility, which can cause adverse effects during processing and also subsequently in the event of incomplete reaction with the epoxy resin.

Aminic hardeners with properties just as advantageous as those of TETA or D230, but with lower volatility, would be desirable for epoxy resins.

The invention can therefore be considered to be based on the object of providing, for epoxy resins, a rapid-curing aminic hardener which can provide comparatively low initial viscosity for the curable epoxy resin composition, and good structural properties (for example glass transition temperature (Tg), flexibility, breaking strength, and Shore D hardness) for the cured epoxy resin, while at the same time having comparatively low volatility. This hardener should also preferably provide early-stage water resistance of the hardened epoxy resin within a comparatively short period.

Accordingly, the present invention provides the use of oligo-N,N-bis(3-aminopropyl)methylamine (polyBAPMA) as hardener for epoxy resins, and also a curable composition which comprises a resin component and a hardener component, where the resin component comprises one or more epoxy resins, and the hardener component comprises polyBAPMA.

polyBAPMA of the invention has on average at least 9 N atoms in the form of primary, secondary, or tertiary amino groups per molecule.

For the purposes of the present invention, the term polyBAPMA preferably relates to homopolymers made of bis (3-aminopropyl)methylamine (BAPMA) units (—NH—$CH_2$—$CH_2$—$CH_2$—$N(CH_3)$—$CH_2$—$CH_2$—$CH_2$—NH—), where (as a consequence of the production process) the BAPMA-internal N-bonded methyl group can, for a proportion of at most 10%, preferably at most 5%, particularly preferably at most 1%, of these groups, have been removed or transferred to other secondary or primary amino groups of the polymer. The polyBAPMA of the invention can also involve heteropolymers which also have, alongside the BAPMA units, other alkylenediamine structural elements, for example —NH—$CH_2$—$CH_2$—NH—, —NH—$(CH_2)_4$—NH—, —NH—$(CH_2)_6$—NH—, or —NH—$(CH_2)_8$—NH-structural elements, where the BAPMA units in these heteropolymers make up the majority of the molar content, preferably at least 60 mol %, in particular at least 70 mol %, based on all of the alkylenediamine structural elements.

The polyBAPMA of the invention can be linear or branched, and the branch here leads to formation of a tertiary amino group. Branches can be —$CH_2$—$CH_2$—$CH_2$—N ($CH_3$)—$CH_2$—$CH_2$—$CH_2$—$NH_2$ groups, but can also be longer branches made of a plurality of BAPMA units, which in turn themselves may be branched. The degree of branching (DB) can be determined by way of example by means of $^{13}$C NMR or $^{15}$N NMR spectroscopy. Fréchet's approximation determines the degree of branching as follows:

$$DB_F=(D+T)/(D+T+L),$$

where D ("dendritic") is the content of tertiary amino groups (not including the methyl-substituted tertiary amino groups resulting from the middle amino group of the BAPMA). L ("linear") is the content of secondary amino groups, and T ("terminal") is the content of primary amino groups. However, this approximation does not include the focal group of the branched polymer, and is applicable only to high degrees of the polymerization. Frey's definition of DB provides a suitable description of the situation that is also applicable in the field of oligomers. Accordingly:

$$DB_{HF}=2D/(2D+L).$$

For the process of the invention, $CH_3$ groups are not regarded as a branch.

It is preferable that polyBAPMA of the invention has no, or only few, branches, i.e. is linear or in essence linear. It is preferable that the $DB_{HF}$ of the polyBAPMA of the invention is ≤0.3, in particular ≤0.1, very particularly preferably ≤0.05.

It is preferable that polyBAPMA of the invention is produced by means of catalytic polytransamination of N,N-bis(3-aminopropyl)methylamine (BAPMA), optionally together with one or more other diamines.

Up to 40 mol %, in particular up to 30 mol %, of the BAPMA may optionally be replaced by one or more aliphatic diamines (other diamines).

These other diamines are preferably linear, branched, or cyclic aliphatic diamines. Examples of these other diamines are ethylenediamine, butylenediamine (for example 1,4-butylenediamine or 1,2-butylenediamine), diaminopentane (for example 1,5-diaminopentane or 1,2-diaminopentane), diaminohexane (for example 1,6-diaminohexane, 1,2-diaminohexane or 1,5-diamino-2-methylpentane), diaminoheptane (for example 1,7-diaminoheptane or 1,2-diaminoheptane), diaminooctane (for example 1,8-diaminooctane or 1,2-diaminooctane), diaminononane (for example 1,9-diaminononane or 1,2-diaminononane), diaminodecane (for example 1,10-diaminodecane or 1,2-diaminodecane), diaminoundecane (for example 1,11-diaminoundecane or 1,2-diaminoundecane), diaminododecane (for example 1,12-diaminododecane or 1,2-diaminododecane), where the corresponding α,ω-diamines are preferred over their 1,2-isomers, 3,3'-dimethyl-4,4'-diaminodicyclohexylmethane, 4,4'-diaminodicyclohexylmethane, isophoronediamine, 2,2-dimethylpropane-1,3-diamine, 4,7,10-trioxatridecane-1,13-diamine, 4,9-dioxadodecane-1,12-diamine, polyetheramines, and 3-(methylamino)propylamine. Preference is given to 1,2-ethylenediamine and 1,4-butanediamine.

The polyBAPMA of the invention is particularly preferably produced by means of catalytic polytransamination of BAPMA without other diamines.

Accordingly, in one preferred embodiment of the invention the polyBAPMA is a homopolymer composed solely of BAPMA units (—NH—$CH_2$—$CH_2$—$CH_2$—N($CH_3$)—$CH_2$—$CH_2$—$CH_2$—NH—), where the BAPMA-internal N-bonded methyl group (as a consequence of the production process) can, for a proportion of at most 10%, preferably at most 5%, particularly preferably at most 1%, of these groups, have been removed or transferred to other secondary or primary amine groups of the polymer.

Suitable catalysts for the polytransamination of BAPMA and optionally of one or more other diamines are in particular heterogeneous catalysts which comprise one or more transition metals selected from the group consisting of Fe, Co, Ni, Ru, Rh, Pd, Os, Ir, and Pt, preferably selected from the group consisting of Co, Ni, Ru, Cu, and Pd, particularly preferably selected from the group consisting of Co, Ni, and Cu.

The polytransamination of BAPMA optionally together with one or more other diamines can be carried out in the presence of hydrogen, for example under a hydrogen partial pressure of from 1 to 400 bar, preferably from 1 to 200 bar, and in particular from 1 to 100 bar.

The polytransamination of BAPMA optionally together with one or more other diamines can be carried out at a temperature in the range from 50 to 200° C., preferably in the range from 90 to 180° C., in particular in the range from 120 to 170° C.

The polytransamination of BAPMA optionally together with one or more other diamines can be carried out at a pressure in the range from 1 to 400 bar, preferably in the range from 1 to 200 bar, and in particular in the range from 1 to 100 bar.

The hydroxy number of the polyBAPMA of the invention is preferably ≤100 mg KOH/g, particularly preferably ≤50 mg KOH/g, very particularly preferably ≤5 mg KOH/g, in particular ≤2 mg KOH/g, determined in accordance with DIN 53240. It is particularly preferable that the hydroxy number of the polyBAPMA is 0 mg KOH/g or almost 0 mg KOH/g, i.e. that the polyBAPMA is free, or in essence free, of hydroxy groups.

The amine number of the polyBAPMA of the invention for primary amines is preferably in the range from 10 to 1000 mg KOH/g, preferably from 20 to 500 mg KOH/g, particularly preferably from 30 to 300 mg KOH/g, very particularly preferably from 50 to 100 mg KOH/g. The amine number for primary amines is determined in accordance with the standard ASTM D2074-07.

The amine number of the polyBAPMA of the invention for secondary amines is preferably in the range from 50 to 1500 mg KOH/g, preferably from 100 to 1000 mg KOH/g, particularly preferably from 150 to 600 mg KOH/g. The amine number for secondary amines is determined in accordance with the standard ASTM D2074-07.

The amine number of the polyBAPMA of the invention for tertiary amines is preferably in the range from 50 to 1500 mg KOH/g, preferably from 100 to 1000 mg KOH/g, particularly preferably from 150 to 600 mg KOH/g. The amine number for tertiary amines is determined in accordance with the standard ASTM D2074-07.

It is preferable that the polyBAPMA of the invention has an amine number for primary amines in the range from 10 to 1000 mg KOH/g, preferably from 20 to 500 mg KOH/g, particularly preferably from 30 to 300 mg KOH/g, very particularly preferably from 50 to 100 mg KOH/g, and an amine number for secondary amines in the range from 50 to 1500 mg KOH/g, preferably from 100 to 1000 mg KOH/g, particularly preferably from 150 to 600 mg KOH/g, and an amine number for tertiary amines in the range from 50 to 1500 mg KOH/g, preferably from 100 to 1000 mg KOH/g, particularly preferably from 150 to 600 mg KOH/g. The amine number for primary, secondary and tertiary amines is determined in accordance with the standard ASTM D2074-07.

The proportion of the tertiary amino groups in the polyBAPMA of the invention is preferably in the range from 30 to 70 mol %, with preference from 40 to 60 mol %, based on the total quantity of nitrogen in the polyBAPMA.

The number-average molar mass $M_n$ of the poyBAPMA of the invention is preferably in the range from 400 to 5000 g/mol, particularly preferably in the range from 600 to 3000 g/mol, very particularly preferably in the range from 800 to 2000 g/mol, and can be determined by means of size-exclusion chromatography. The molar mass distribution $M_w/M_n$ (polydispersity index (PDI), where $M_w$ is the weight-average molecular weight) is preferably in the range from 1.1 to 20, particularly preferably in the range from 1.1 to 10, in particular from 1.2 to 5.

The vapor pressure of the polyBAPMA of the invention at 25° C. is preferably at most 0.1 Pa, particularly preferably at most 0.02 Pa, in particular at most 0.005 Pa. It therefore has markedly lower volatility than comparable hardeners, for example TETA.

The curable composition of the invention can also comprise, alongside polyBAPMA, other polyamines, in particular aliphatic and cycloaliphatic polyamines, as constituent of the hardener component. poyBAPMA preferably makes up at least 50% by weight, particularly preferably at least 80% by weight, very particularly preferably at least 90% by weight, based on the total quantity of the aminic hardeners in the curable composition. In one preferred embodiment, the curable composition comprises no other aminic hardeners alongside polyBAPMA. For the purposes of the present invention, aminic hardeners are amines with NH-functionality≥2; (by way of example, the NH-functionality of a primary monoamine is 2, that of a primary diamine is 4, and that of an amine having 3 secondary amino groups is 3).

Epoxy resins according to this invention have from 2 to 10 epoxy groups, preferably from 2 to 6, very particularly preferably from 2 to 4, and in particular 2. The epoxy groups are in particular glycidyl ether groups of the type produced when alcohol groups react with epichlorohydrin. The epoxy resins can be low-molecular-weight compounds which generally have an average molar mass ($M_n$) smaller than 1000 g/mol, or can be compounds of higher molecular weight (polymers). The degree of oligomerization of these polymeric epoxy resins is preferably from 2 to 25 units, particularly preferably from 2 to 10 units. They can be aliphatic or cycloaliphatic compounds, or compounds having aromatic groups. In particular, the epoxy resins are compounds having two aromatic or aliphatic 6-membered rings, or are oligomers of these. Epoxy resins of industrial importance are those obtainable via reaction of epichlorohydrin with compounds having at least two reactive hydrogen atoms, in particular with polyols. Particularly important epoxy resins are those obtainable via reaction of epichlorohydrin with compounds which have at least two, preferably two, hydroxy groups, and which contain two aromatic or aliphatic 6-membered rings. Compounds of this type that may be mentioned are in particular bisphenol A and bisphenol F, and also hydrogenated bisphenol A and bisphenol F; the corresponding epoxy resins are the diglycidyl ethers of bisphenol A or bisphenol F, or of hydrogenated bisphenol A or bisphenol F. Bisphenol A diglycidyl ether (DGEBA) is usually used as epoxy resin according to this invention. Other suitable epoxy resins according to this invention are tetraglycidyl-methylenedianiline (TGMDA) and triglycidylaminophenol, and mixtures thereof. Other compounds that can be used are reaction products of epichlorohydrin with other phenols, e.g. with cresols or with phenol-aldehyde adducts, for example the phenol-aldehyde resins, in particular with novolacs. Other suitable compounds are epoxy resins not deriving from epichlorohydrin. It is possible by way of example to use epoxy resins which comprise epoxy groups by virtue of reaction with glycidyl (meth)acrylate. It is preferable in the invention to use epoxy resins or mixtures thereof that are liquid at room temperature (25° C.). The epoxy equivalent weight (EEW) is the average weight of the epoxy resin in g per mole of epoxy group.

The curable composition of the invention is preferably composed of at least 50% by weight of epoxy resin.

One particular embodiment of the invention provides a curable composition which comprises a resin component and a hardener component, where the resin component comprises one or more epoxy resins and one or more reactive diluents, and the resin component comprises polyBAPMA.

For the purposes of the invention, reactive diluents are compounds which reduce the initial viscosity of the curable composition and, during the course of the curing of the curable composition, enter into chemical bonding with the epoxy resin network as it develops. For the purpose of this invention, preferred reactive diluents are low-molecular-weight, organic, preferably aliphatic, compounds having one or more epoxy groups, preferably having two epoxy groups, and also cyclic carbonates, in particular cyclic carbonates having from 3 to 10 carbon atoms, for example ethylene carbonate, propylene carbonate, butylene carbonate, or vinylene carbonate.

Reactive diluents of the invention are preferably selected from the group consisting of ethylene carbonate, vinylene carbonate, propylene carbonate, 1,4-butanediol bisglycidyl ether, 1,6-hexanediol bisglycidyl ether (HDDE), glycidyl neodecanoate, glycidyl versatate, 2-ethylhexyl glycidyl ether, neopentyl glycol diglycidyl ether, p-tert-butyl glycidyl ether, butyl glycidyl ether, $C_8$-$C_{10}$-alkyl glycidyl ether, $C_{12}$-$C_{14}$-alkyl glycidyl ether, nonylphenyl glycidic ether, p-tert-butylphenyl glycidic ether, phenyl glycidic ether, o-cresyl glycidic ether, polyoxypropylene glycol diglycidic ether, trimethylolpropane triglycidic ether (TMP), glycerol triglycidic ether, triglycidyl para-aminophenol (TGPAP), divinylbenzyl dioxide and dicyclopentadiene diepoxide. They are particularly preferably selected from the group consisting of 1,4-butanediol bisglycidyl ether, 1,6-hexanediol bisglycidyl ether (HDDE), 2-ethylhexyl glycidyl ether, $C_8$-$C_{10}$-alkyl glycidyl ether, $C_{12}$-$C_{14}$-alkylglycidyl ether, neopentyl glycol diglycidyl ether, p-tert-butyl glycidic ether, butyl glycidic ether, nonylphenyl glycidic ether, p-tert-butylphenyl glycidic ether, phenyl glycidic ether, o-cresyl glycidic ether, trimethylolpropane triglycidic ether (TMP), glycerol triglycidic ether, divinylbenzyl dioxide and dicyclopentadiene diepoxide. They are in particular selected from the group consisting of 1,4-butanediol bisglycidyl ether, $C_8$-$C_{10}$-alkyl monoglycidyl ether, $C_{12}$-$C_{14}$-alkyl monoglycidyl ether, 1,6-hexanediol bisglycidyl ether (HDDE), neopentyl glycol diglycidyl ether, trimethylolpropane triglycidic ether (TMP), glycerol triglycidic ether, and dicyclopentadiene diepoxide.

In one particular embodiment of the present invention, the reactive diluents are low-molecular-weight organic compounds having two or more, preferably two, epoxy groups, for example 1,4-butanediol bisglycidyl ether, 1,6-hexanediol bisglycidyl ether (HDDE), neopentyl glycol diglycidyl ether, polyoxypropylene glycol diglycidic ether, trimethylolpropane triglycidic ether (TMP), glycerol triglycidic ether, triglycidylpara-aminophenol (TGPAP), divinylbenzene dioxide, or dicyclopentadiene diepoxide, preferably 1,4-butanediol bisglycidyl ether, 1,6-hexanediol bisglycidyl ether (HDDE), neopentyl glycol diglycidyl ether, trimethylolpropane triglycidic ether (TMP), glycerol triglycidic ether, divinylbenzyl dioxide, or dicyclopentadiene diepoxide, in particular 1,4-butanediol bisglycidyl ether, 1,6-hexanediol bisglycidyl ether (HDDE), neopentyl glycol diglycidyl ether, trimethylolpropane triglycidic ether (TMP), glycerol triglycidic ether, or dicyclopentadiene diepoxide. In one particular embodiment the reactive diluents are low-molecular-weight aliphatic compounds having two or more, preferably two, epoxy groups.

In one particular embodiment of the present invention, the reactive diluents are low-molecular weight organic compounds having one epoxy group, for example glycidyl neodecanoate, glycidyl versatate, 2-ethylhexyl glycidyl ether, p-tert-butyl glycidic ether, butyl glycidic ether, $C_8$-$C_{10}$-alkyl glycidyl ether, $C_{12}$-$C_{14}$-alkyl glycidyl ether, nonylphenyl glycidic ether, p-tert-butylphenyl glycidic ether, phenylglycidic ether, or o-cresyl glycidic ether, preferably 2-ethylhexyl glycidyl ether, p-tert-butyl glycidic ether, butyl glycidic ether, $C_8$-$C_{10}$-alkyl glycidyl ether, $C_{12}$-$C_{14}$-alkyl glycidyl ether, nonylphenyl glycidic ether, p-tert-butylphenyl glycidic ether, phenyl glycidic ether, or o-cresyl glycidic ether, in particular $C_8$-$C_{10}$-alkyl glycidyl ether or $C_{12}$-$C_{14}$-alkyl glycidyl ether. In one particular embodiment the reactive diluents are low-molecular-weight aliphatic compounds having one epoxy group.

In one particular embodiment of the present invention, the reactive diluents are cyclic carbonates having from 3 to 10 carbon atoms, for example ethylene carbonate, propylene carbonate, butylene carbonate, or vinylene carbonate, preferably ethylene carbonate, propylene carbonate, or vinylene carbonate.

The proportion made up by the reactive diluents of the invention is preferably up to 30% by weight, particularly preferably up to 25% by weight, in particular from 1 to 20% by weight, based on the resin component (epoxy resin and any reactive diluents used) of the curable composition. The proportion made up by the reactive diluents of the invention, based on the entire curable composition, is preferably up to 25% by weight, particularly preferably up to 20% by weight, in particular from 1 to 15% by weight, based on the entire curable composition.

In the curable composition of the invention it is preferable that the compounds of the resin components (epoxy resins inclusive of any reactive diluents having their respective reactive groups) and aminic hardeners are used in approximately stoichiometric ratio based on the reactive compounds of the resin components (epoxy groups and, for example, any carbonate groups) and, respectively, on the NH-functionality. Examples of particularly suitable ratios of reactive groups of the compounds of the resin component to NH-functionality are from 1:0.8 to 1:1.2. Reactive groups of the compounds of the resin component are those groups that, under the conditions of curing, react with the amino groups of the amino hardener(s).

The curable composition of the invention can also other additions, for example inert diluents, curing accelerators, reinforcement fibers (in particular glass fibers or carbon fibers), pigments, dyes, fillers, release agents, tougheners, flow agents, antifoams, flame-retardant agents, or thickeners. The quantity added of these additions is usually functional, an example being a pigment quantity that leads to the desired color of the composition. The compositions of the invention usually comprise from 0 to 50% by weight, preferably from 0 to 20% by weight, for example from 2 to 20% by weight, of the entirety of all additives, based on the entire curable composition. For the purposes of this invention, additives are all additions to the curable composition that are neither epoxy compounds nor aminic hardeners.

The present invention also provides the use of polyBAPMA as hardener for epoxy resins in curable compositions, in particular for the production of coatings, particularly of floor coatings with early-stage water resistance.

The present invention preferably provides the use of polyBAPMA as hardener for epoxy resins in curable compositions with one or more reactive diluents.

The present invention further provides a process for the production of cured epoxy resins made of the curable composition of the invention. The process of the invention for the production of these cured epoxy resins brings the components (epoxy resins, polyBAPMA, and optionally other components, for example additives) into contact with one another in any desired sequence, mixes them, and then cures them at a temperature practicable for the application. The curing preferably takes place at a temperature of at least 0° C., particularly at least 10° C.

In one particular embodiment, the cured epoxy resin is also exposed to a thermal posttreatment, for example in the context of the curing process, or in the context of optional downstream heat-conditioning.

The curing process can take place at atmospheric pressure and at temperatures below 250° C., in particular at temperatures below 210° C., preferably at temperatures below 185° C., in particular in the temperature range from 0 to 210° C., very particularly preferably in the temperature range from 10 to 185° C.

The curing process takes place by way of example in a mold until dimensional stability has been achieved and the workpiece can be removed from the mold. The following process for dissipating internal stresses in the workpiece and/or for completing the crosslinking of the cured epoxy resin is termed heat-conditioning. In principle it is also possible to carry out the heat-conditioning process before removal of the workpiece from the mold, for example in order to complete crosslinking. The heat-conditioning process is usually carried out at temperatures at the limit of dimensional stability. Heat-conditioning is usually carried out at temperatures from 120 to 220° C., preferably at temperatures from 150 to 220° C. The period for which the cured workpiece is exposed to the heat-conditioning conditions is usually from 30 to 240 min. Longer heat-conditioning times, dependent on the dimensions of the workpiece, can also be appropriate.

The invention further provides the cured epoxy resin made of the curable composition of the invention. The invention in particular provides cured epoxy resin obtainable or obtained through curing of a curable composition of the invention. The invention in particular provides cured epoxy resin obtainable or obtained by the process of the invention for the production of cured epoxy resins.

The curable compositions of the invention are suitable as coating compositions or as impregnating compositions, as adhesive, for producing moldings and composite materials, or as casting compositions for embedding, binding, or strengthening of moldings. They are in particular suitable for the production of moldings by the RDM process. Examples that may be mentioned of coating compositions are lacquers and in particular floor coatings. In particular, the curable compositions of the invention can give scratch-resistant protective lacquers on any desired substrates, e.g. those made of metal, of plastic, or of timber materials. The curable compositions are also suitable as insulation coatings in electronic applications, e.g. as insulation coating for wires and cables. Mention may also be made of the use for producing photoresists. They are also suitable as repair material, e.g. in the renovation of pipes without disassembly of the pipes (cure in place pipe (CIPP) rehabilitation). They are in particular suitable for the sealing of floors. They are also suitable for producing composite materials.

Composite materials (composites) comprise different materials, e.g. plastics and reinforcing materials (for example glass fibers or carbon fibers) bonded to one another.

Production processes that may be mentioned for composite materials are the curing of preim-pregnated fibers or fiber fabrics (e.g. prepregs) after storage, and also extrusion, pultrusion, winding, and infusion/injection processes, such as vacuum infusion (VARTM), resin transfer molding, (RTM) and also liquid resin press molding processes, such as BMC (bulk mold compression).

The invention further provides moldings made of the cured epoxy resin of the invention, composite materials which comprise the cured epoxy resin of the invention, and also fibers impregnated with the curable composition of the invention. The composite materials of the invention preferably comprise glass fibers and/or carbon fibers, alongside the cured epoxy resin of the invention.

The invention further provides coatings, preferably floor coatings made of the cured epoxy resin of the invention. These are in particular coatings having early-stage water resistance.

The glass transition temperature (Tg) can be determined by means of dynamic mechanical analysis (DMA), for example in accordance with the standard DIN EN ISO 6721, or by using a differential calorimeter (DSC), for example in accordance with the standard DIN 53765. In the case of DMA, a rectangular test specimen is subjected to torsional load at an imposed frequency and with prescribed deformation. The temperature here is raised at a defined gradient, and storage modulus and loss modulus are recorded at fixed intervals. The former represents the stiffness of a viscoelastic material. The latter is proportional to the energy dissipated within the material. The phase displacement between the dynamic stress and the dynamic deformation is characterized by the phase angle δ. The glass transition temperature can be determined by various methods: as maximum of the tan δ curve, as maximum of the loss modulus, or by means of a tangential method applied to the storage modulus. When the glass transition temperature is determined with use of a differential calorimeter, a very small amount of specimen (about 10 mg) is heated in an aluminum crucible and the heat flux is measured in relation to a reference crucible. This cycle is repeated three times. The glass transition is determined as average from the second and third measurement. The Tg transition can be evaluated from the heat flux curve by way of the inflection point, by a half-width method, or by the midpoint-temperature method.

The expression pot life means a property that is usually utilized in order to compare the reactivity of various resin/hardener combinations and/or resin/hardener-mixture combinations. The measurement of pot life is a method for characterizing the reactivity of lamination systems by means of a temperature measurement. There are established application-dependent deviations from the parameters (quantity, test conditions, and test method) described in those contexts. Pot life is determined here as follows: 100 g of the curable composition comprising epoxy resin and hardener or hardener mixture are charged to a container (usually a paperboard beaker). A thermometer is immersed in this curable composition, and measures and stores the temperature value at defined time intervals. As soon as said curable composition has solidified, the measurement process is terminated, and the time required to reach the maximum temperature is determined. In the event that the reactivity of a curable composition is too small, said measurement is carried out at increased temperature. It is always necessary to state the test temperature alongside the pot life.

The gel time in accordance with DIN 16 945 provides guidance concerning the interval between the addition of the hardener to the reaction mixture and the conversion of the reactive resin composition from the liquid state to the gel state. The temperature plays an important part here, and the gel time is therefore always determined for a predetermined temperature. With the aid of dynamic-mechanical methods, in particular rotary viscometry, it is possible to study even small sample quantities quasi-isothermally, and to record the entire viscosity curve or stiffness curve of these. In accordance with the standard ASTM D4473, the gel point is the intersection between the storage modulus G' and the loss modulus G", where the damping value tan-δ is 1, and the interval between the addition of the hardener to the reaction mixture and arrival at the gel point is the gel time. The gel time thus determined can be considered to be a measure of hardening rate.

Shore hardness is a numerical indicator for polymers, for example cured epoxy resins, which is directly related to the penetration depth of an indentation into a test specimen, and it is therefore a measure of the hardness of the test specimen. It is determined by way of example in accordance with the standard DIN ISO 7619-1. A distinction is drawn between Shore A, C and D methods. The indenter used is a spring-loaded pin made of hardened steel. In the test, the indenter is forced into the test specimen by the force from the spring, and the indentation depth is a measure of Shore hardness. Determination of Shore A and C hardness uses, as indenter, a truncated cone with a tip of diameter 0.79 mm and an insertion angle of 35°, whereas the Shore hardness D test uses, as indenter, a truncated cone with a spherical tip of radius 0.1 mm and an insertion angle of 30°. The Shore hardness values are determined by introducing a scale ex-tending from 0 Shore (indentation depth 2.5 mm) to 100 Shore (indentation depth 0 mm). The scale value 0 here corresponds to the maximal possible indentation, where the material offers no resistance to indentation by the indenter. In contrast, the scale value 100 corresponds to very high resistance of the material to the indentation, and practically no impression is produced. The temperature plays a decisive part in the determination of Shore hardness, and the measurements must therefore be carried out in accordance with the standard within a restricted temperature range of 23° C.±2° C.

Early-stage water resistance is the property of a coating to avoid damage to the coating on contact with water only a short time after the application process. In the case of coatings based on epoxy resins and aminic hardeners, a particular factor involved here is carbamate formation, which is discernible from the development of white streaks or crusts on the surface of the fresh coating.

The following, non-limiting examples will now be used to provide further explanation of the invention.

EXAMPLE 1

Production of oligo-N,N-bis(3-aminopropyl)methylamine (polyBAPMA)

N,N-bis(3-aminopropyl)methylamine (BAPMA) was polymerized in a 0.3 L reactor (length 2.4 m, diameter 1.2 cm) made of stainless steel (1.4571). 0.38 kg of an unsupported cobalt catalyst (produced in accordance with EP636409A (example catalyst A)) had been charged to the reactor. In liquid-phase mode, 0.04 kg of BAPMA and 10

NL of hydrogen per hour were passed over the catalyst at 160° C. and 50 bar total hydrogen pressure. The catalyst hourly velocity was 0.2 kg per liter of catalyst and hour. The reaction product was condensed, and BAPMA, dimers, and trimers were removed by distillation from the polymer mixture at 250° C. and 1 mbar in an evaporator. The amine numbers of this product were determined, as also, with the aid of size exclusion chromatography, were the molar masses $M_n$ and $M_w$, and also the polydispersity index (PDI) (table 1).

TABLE 1

Characterization of the resultant polyBAPMA

| | |
|---|---|
| Amine number (primary) in mg KOH/g | 74 |
| Amine number (secondary) in mg KOH/g | 429 |
| Amine number (tertiary) in mg KOH/g | 386 |
| $M_n$ (g/mol) | 902 |
| $M_w$ (g/mol) | 1572 |
| PDI | 1.7 |

EXAMPLE 2

Production of the Curable Composition (Reactive Resin Composition) and Reactivity Profile Testing The formulations to be compared were produced by mixing stoichiometric quantities of the respective amines (TETA (Huntsman), D230 (polyetheramine D230, BASF) and, respectively, polyBAPMA (from example 1) with an epoxy resin based on bisphenol A diglycidyl ether (Epilox A19-03, Leuna Harze, EEW 183), and tested immediately.

The rheological measurements for the reactivity profile testing of the aliphatic amines with epoxy resins were carried out in a shear-stress-controlled plate-on-plate rheometer (MCR 301, Anton Paar) with plate diameter 15 mm and gap 0.25 mm at various temperatures.

Test 1a) Comparison of the time required for the freshly produced reactive resin composition to reach a viscosity of 10 000 mPa·s at a defined temperature. The measurement was made in rotation in the abovementioned rheometer at various temperatures (23° C. and 75° C.). At the same time, the initial viscosity was determined (averaged over the period from 2 to 5 minutes after mixing the components) for the respective mixtures at the respective temperatures. Table 2 collates the results.

TABLE 2

Isothermal viscosity increase at 10 000 mPa*s

| | TETA | D230 | polyBAPMA |
|---|---|---|---|
| Period required to reach viscosity 10 000 mPa*s at 23° C. | 115 min | 478 min | 18 min |
| Period required to reach viscosity 10 000 mPa*s at 75° C. | 6.5 min | 40 min | 9 min |
| Initial viscosity at 23° C. | 336 mPa*s | 886 mPa*s | 8.053 mPa*s |
| Initial viscosity at 75° C. | 100 mPa*s | 39 mPa*s | 180 mPa*s |

Test 1 b) Comparison of gel times. The measurement was carried out in oscillation in the abovementioned rheometer at a temperature of 23° C. and, respectively, 75° C. The point of intersection of loss modulus (G") and storage modulus (G') provides the gel time. Table 3 collates the test results.

TABLE 3

Isothermal gel times

| | TETA | D230 | polyBAPMA |
|---|---|---|---|
| At 23° C. | 275 min | 1850 min | 575 min |
| At 75° C. | 10 min | 60 min | 11 min |

EXAMPLE 3

Exothermic Profile of the Curable Composition (Reactive Resin Composition) and Glass Transition Temperatures of the Cured Epoxy Resins (Hardened Thermosets)

The DSC studies of the curing reaction of the amines used in stoichiometric quantities (TETA (Huntsman), D230 (polyetheramine D230, BASF) and, respectively, polyBAPMA (corresponding to ex. 1)) with an epoxy resin (Epilox A19-03, Leuna Harze, EEW 183) based on bisphenol A diglycidyl ether to determine onset temperature (To) and exothermic energy (H) was carried out in accordance with ASTM 03418, as also was the determination of glass transition temperatures (Tg) for the temperature profile (0° C.→5K/min 180° C.→30 min 180° C.→20K/min 0° C.→20K/min 220° C.). In each case 2 passes were carried out. Table 4 collates the test results. The Tg measurement stated comes from the 2nd pass of the temperature profile.

TABLE 4

Exothermic profile and glass transition temperatures

| | TETA | D230 | polyBAPMA |
|---|---|---|---|
| To | 62° C. | 83° C. | 73° C. |
| H | 603 J/g | 422 J/g | 438 J/g |
| Tg | 137° C. | 93° C. | 85° C. |

EXAMPLE 4

Mechanical Tests on the Cured Epoxy Resins (Hardened Thermosets)

The mechanical properties of the thermosets made of amines (TETA (Huntsman), D230 (polyetheramine D230, BASF) and, respectively, polyBAPMA (corresponding to ex. 1)) with an epoxy resin (Epilox A19-03, Leuna Harze. EEW 183) based on bisphenol A diglycidyl ether were studied by mixing the two components in a high-speed mixer (1 min at 2000 rpm), applying vacuum (1 mbar) at 23° C. for degassing, and then manufacturing moldings. The mixture was cured for 2 h at 80° C. and then for 3 h at 125° C. The mechanical tests were carried out in accordance with ISO 527-2:1993 and ISO 178:2006.

TABLE 5

Mechanical properties of the thermosets

| | TETA | D230 | polyBAPMA |
|---|---|---|---|
| Tensile strength (in MPa) | 72.5 | 59.36 | 56.15 |
| Tensile elongation (in %) | 6.15 | 5.05 | 6.76 |
| Tensile modulus of elasticity E (in MPa) | 2854 | 2840 | 2344 |
| Flexural Strength (in MPa) | 105.26 | 97.39 | 87.53 |

TABLE 5-continued

Mechanical properties of the thermosets

|  | TETA | D230 | polyBAPMA |
|---|---|---|---|
| Flexural elongation (in %) | 6.01 | 6.08 | 6.1 |
| Flexural modulus (in MPa) | 2953 | 3011 | 2393 | polyBAPMA-cured epoxy resin proves to be more flexible (lower modulus of elasticity and flexural modulus) in comparison with TETA- or D230-cured epoxy resin, while achieving increased elongation at break.

EXAMPLE 5

Early-Stage Water Resistance of the Thermosets

The early-stage water resistance of the thermosets made of the amines (TETA (Huntsman), D230 (polyetheramine D230, BASF) and, respectively, polyBAPMA (corresponding to ex. 1)) with an epoxy resin (Epilox A19-03, Leuna Harze, EEW 183) based on bisphenol A diglycidyl ether was studied by mixing the two components in stoichiometric ratio in a high-speed mixer (1 min at 2000 rpm), pouring the mixture into a number of shell molds and storing same at 23° C. in a cabinet under controlled conditions (60% relative humidity). At regular intervals a shell mold was removed, and 2 ml of distilled water was applied to the surface of the epoxy resin. The time after which the epoxy resin no longer exhibits any carbamate formation on contact with water, and therefore early-stage water resistance has been achieved, was determined. Carbamate formation is discernible from formation of crusts or white streaking on the surface of the epoxy resin. Table 6 collates the results.

TABLE 6

Early-stage water resistance for epoxy resin compositions with various hardeners ($t_F$: Period required to reach early-stage water resistance)

|  | TETA | D230 | polyBAPMA |
|---|---|---|---|
| $t_F$ at 23° C. (in h) | 6 | 24 | 18 |

The early-stage water resistance of polyBAPMA-cured epoxy resin is markedly better than that of D230-cured epoxy resin. CL EXAMPLE 6

Mechanical Tests on the Cured Epoxy Resins (Hardened Thermosets)

The mechanical properties of the thermosets made of amines (TETA (Huntsman), D230 (polyetheramine D230, BASF) and, respectively, polyBAPMA (corresponding to ex. 1)) with an epoxy resin component (composed of 900 parts of the bisphenol-A-diglycidyl-ether-based epoxy resin Araldite GY 240 (Huntsman; with EEW 180), 50 parts of the $C_{12}$-$C_{14}$-alkyl glycidyl ether Epodil 748 DA (Air Products; with EEW 290) and 50 parts of the HDDE Araldite DY-H/BD (Huntsman; with EEW 150)) were studied by mixing the two components in a high-speed mixer (1 min at 2000 rpm), applying vacuum (1 mbar) at 23° C. for degassing, and then using a doctor to apply the mixture to a polyamide film. The formulations of the amines here were as follows:
(a) polyBAPMA: 70 parts of polyBAPMA and 30 parts of benzyl alcohol,
(b) D230: 90 parts of D230 and 10 parts of benzyl alcohol,
(c) TETA: 70 parts of TETA and 30 parts of benzyl alcohol.

Shore hardness is determined in accordance with the standard DIN ISO 7619-1. Table 7 collates the results after 1 day at storage temperature T 8° C., 12° C., 20° C. and, respectively, 30° C.

TABLE 7

Shore hardness and surface tack

|  | T (in ° C.) | Shore hardness | Surface tack |
|---|---|---|---|
| poly-BAPMA | 8 | 60A | almost tack-free |
|  | 12 | 70A | tack-free |
|  | 20 | 84D | tack-free |
|  | 30 | 84D | tack-free |
| D230 | 8 | not measurable | tack-free |
|  | 12 | not measurable | tack-free |
|  | 20 | 85A | tack-free |
|  | 30 | 45D | tack-free |
| TETA | 8 | 70D | tack-free |
|  | 12 | 80D | tack-free |
|  | 20 | 83D | tack-free |
|  | 30 | 84D | tack-free |

The invention claimed is:

1. A curable composition, comprising:
a resin component comprising an epoxy resin; and
a hardener component comprising oligo-N,N-bis(3-aminopropyl)methylamine,
wherein the oligo-N,N-bis(3-aminopropyl)methylamine comprises at least 60 mol % of bis(3-aminopropyl)methylamine units, based on a total of amount of alkylenediamine structural elements.

2. The curable composition according to claim 1, wherein the resin component further comprises a reactive diluent.

3. The curable composition according to claim 2, wherein the reactive diluent is a low-molecular-weight organic compound having an epoxy group or is a cyclic carbonate having from 3 to 10 carbon atoms.

4. The curable composition according to claim 1, wherein a number-average molar mass M of the oligo-N,N-bis(3-aminopropyl)methylamine is from 400 to 5000 g/mol.

5. The curable composition according to claim 1, wherein a degree of branching $DB_{HF}$ of the oligo-N,N-bis(3-aminopropyl)methylamine is ≤0.3,
where $DB_{HF}=2D/(2D+L)$, and
where D is the content of tertiary amino groups excluding the methyl-substituted tertiary amino groups, and L is the content of secondary amino groups.

6. The curable composition according to claim 1, wherein an amine number of the oligo-N,N-bis(3-aminopropyl)methylamine is from 10 to 1000 mg KOH/g for primary amines, from 50 to 1500 mg KOH/g for secondary amines, and from 50 to 1500 mg KOH/g for tertiary amines.

7. The curable composition according to claim 1, wherein the oligo-N,N-bis(3-aminopropyl)methylamine is produced by catalytic polytransamination of N,N-bis(3-aminopropyl)methylamine.

8. The curable composition according to claim 1, wherein the oligo-N,N-bis(3-aminopropyl)methylamine is composed solely of N,N-bis(3-aminopropyl)methylamine structural elements, where the N,N-bis(3-aminopropyl)methylamine-internal, N-bonded methyl group can, for a proportion of at most 10% of these groups, have been removed or transferred to other secondary or primary amine groups of the polymer.

9. The curable composition according to claim 1, wherein the epoxy resins and any reactive diluents of the curable composition on the one hand, and a total amount of aminic hardeners, which are amines with NH-functionality ≥2, of the curable composition on the other hand are used in an approximately stoichiometric ratio, based on the reactive groups of the epoxy resins and on any reactive diluents and, respectively, the NH-functionality of the aminic hardeners.

10. The curable composition according to claim 1, wherein the epoxy resin is selected from the group consisting of diglycidyl ether of bisphenol A, diglycidyl ether of bisphenol F, diglycidyl ether of hydrogenated bisphenol A, and diglycidyl ether of hydrogenated bisphenol F.

11. A process for the production of cured epoxy resins, comprising curing a curable composition according to claim 1.

12. A cured epoxy resin, obtained by the process according to claim 11.

13. A molding, comprising a cured epoxy resin according to claim 12.

14. A composite material, comprising a cured epoxy resin according to claim 12 and a reinforcement fiber.

15. A coating, comprising a cured epoxy resin according to claim 12.

16. A cured epoxy resin, obtained by curing a curable composition according to claim 1.

17. The curable composition according to claim 1, wherein the oligo-N,N-bis(3-aminopropyl)methylamine comprises at least 70 mol % of the bis(3-aminopropyl)methylamine units, based on the total of amount of alkylenediamine structural elements.

* * * * *

UNITED STATES PATENT AND TRADEMARK OFFICE
CERTIFICATE OF CORRECTION

PATENT NO. : 10,544,256 B2
APPLICATION NO. : 15/741536
DATED : January 28, 2020
INVENTOR(S) : Alexander Panchenko et al.

Page 1 of 1

It is certified that error appears in the above-identified patent and that said Letters Patent is hereby corrected as shown below:

In the Specification

Column 1, Line 52, "s" should read -- $\leq$ --;

Column 5, Line 3, "poyBAPMA" should read -- polyBAPMA --;

Column 5, Line 21, "poyBAPMA" should read -- polyBAPMA --;

Column 10, Line 37, "ex-tending" should read -- extending --;

Column 12, Line 49, "Harze." should read -- Harze, --;

In the Claims

Column 14, Line 38, Claim 4, "M" should read -- Mn --.

Signed and Sealed this
Twenty-first Day of July, 2020

Andrei Iancu
*Director of the United States Patent and Trademark Office*